United States Patent [19]

Schmidt et al.

[11] Patent Number: 4,708,795

[45] Date of Patent: Nov. 24, 1987

[54] SCREENING DEVICE

[75] Inventors: Gerhard Schmidt, Ettlingen; Christian Neukam, Karlsruhe; Heinrich Schmidt, Düsseldorf, all of Fed. Rep. of Germany

[73] Assignee: Hein, Lehmann AG, Dusseldorf, Fed. Rep. of Germany

[21] Appl. No.: 859,131

[22] Filed: May 2, 1986

[30] Foreign Application Priority Data

May 3, 1985 [DE] Fed. Rep. of Germany ....... 3515891

[51] Int. Cl.$^4$ .............................................. B07B 1/00
[52] U.S. Cl. ..................................... 210/304; 209/362
[58] Field of Search ............... 210/541, 542, 358, 413, 210/414, 415, 512.1, 377, 456, 304; 209/362, 434

[56] References Cited

FOREIGN PATENT DOCUMENTS 13512 of 1911 United Kingdom .
925423 5/1982 U.S.S.R. .............................. 209/362

Primary Examiner—Frank Sever
Attorney, Agent, or Firm—Karl F. Ross; Herbert Dubno

[57] ABSTRACT

An apparatus for the separation of a liquid from a solid of a solid-liquid mixture has a tangential inlet screen section at the upper end of a vertical separating screen which decreases in diameter downwardly. The mixture is introduced tangentially onto the spiral screen section and then closed downwardly onto the separating screen. Solids are recovered at the bottom of the screen and the liquid passes through the screen and is collected outwardly thereof.

10 Claims, 2 Drawing Figures

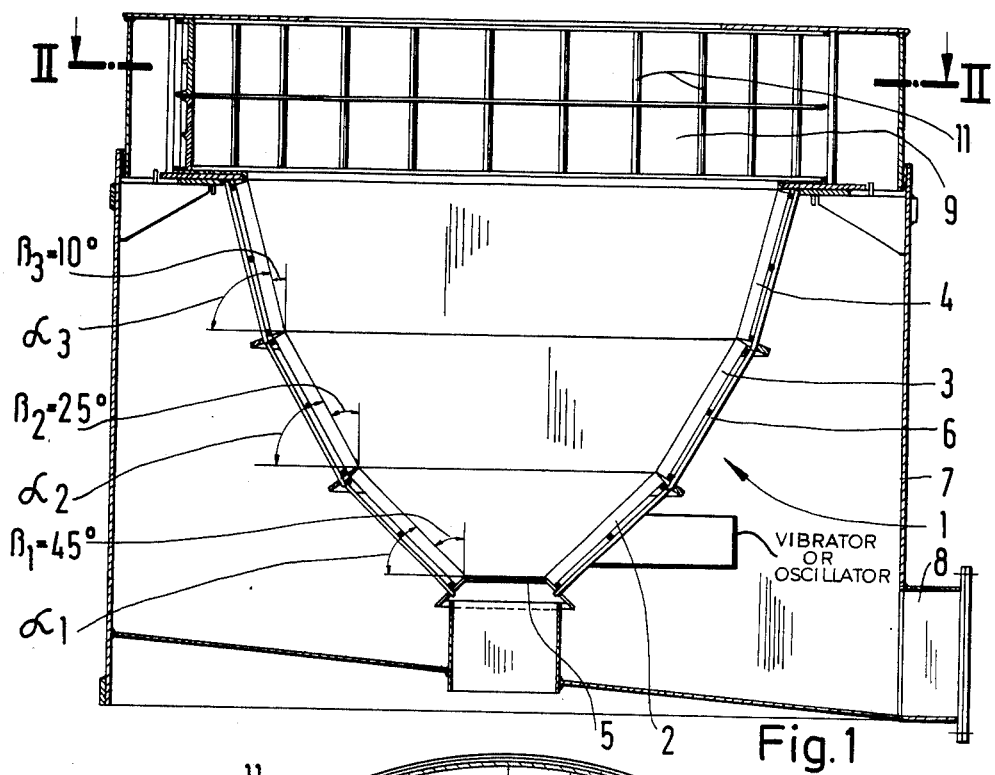
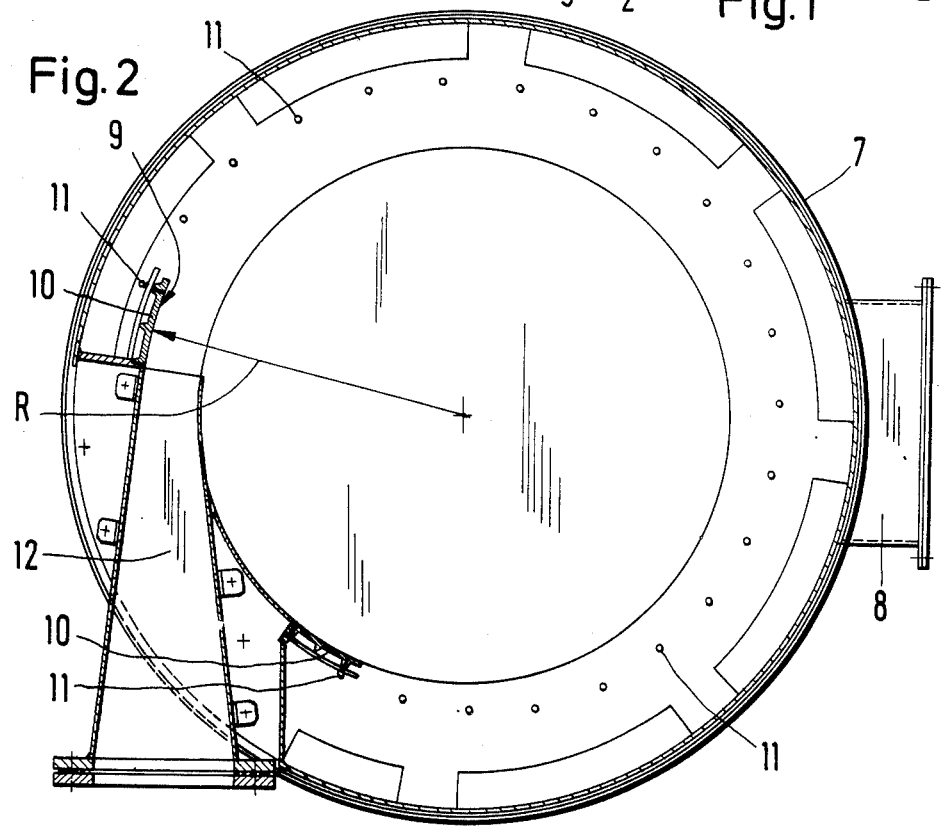

SCREENING DEVICE

FIELD OF THE INVENTION

The invention relates to a screening device for separating solid-liquid mixtures into solid matter and a liquid phase, having a stationary screen basket, the inner wall of which is a surface of revolution with a vertical axis, the diameter of which decreases downwardly and into the uppermost region of which the mixture is fed tangentially at high speed.

BACKGROUND OF THE INVENTION

A screening device for the wet classifying of bulk material is known from the German Patent No. 1,301,226, and comprises several stationary screen baskets arranged one above the other. The solid-liquid mixture is introduced tangentially at high speed in the upper area of the screen basket. The mixture runs downwards into a helical flow in the conical screen basket and at the same time releases the liquid to the slotted hole screen. At the start, that is immediately after the mixture is fed, the screening performance is comparatively low. Also, the mixture flows off too quickly in the lower area through the central, lower basket opening without being adequately processed in this area.

OBJECT OF THE INVENTION

The object of the invention is to improve a screening device of the type mentioned so that an optimum separation effect is achieved at least in the inlet region of the screen basket.

SUMMARY OF THE INVENTION

This object is achieved according to the invention in that the screen basket wall area, into which the mixture initially runs, is spiral shaped, with the maximum radius (R) being at the inlet location and the radius of subsequent areas of the inlet region progressively decreasing.

In this way, a substantially improved screening performance is achieved at the beginning, that is immediately after the mixture runs into the screen basket. About 90% of the liquid is separated out in this upper spiral-shaped area.

At the same time, the inlet area can be formed by a slotted hole screen having approximately vertical screen gaps in order to improve the screening performance and the water-removal performance. The cylindrical screen is used for both classification that is for discharging fine material finer than the gap width, and for removing the water, that is for extracting the liquid phase.

The mixture can be fed very precisely and the feed speed can be determined and changed by use of a tangential nozzle which can be replaced selectively by nozzles having othercross-sections. For this purpose, more than one feed nozzled can also be provided.

An optimum and easily calculated feed speed is achieved if the feed speed is $$v = \sqrt{\frac{d \cdot g}{2 \cdot tg\beta}}$$

with d being the diameter of the basket at the feed location, $\beta$ being the basket angle (i.e. the angle between the axis and a generatrix of the surface) and g being the acceleration due to gravity.

In this way, it becomes possible, in the upper region of the screen basket at which the mixture circulates at high speed, for the mixture to sink only slightly downwards and therefore for the screen surface to be of use largely for extracting the liquid.

The screen basket can be manufactured particularly simply and inexpensively, with adequate screening performance, when it is made up of two or more truncated cone (frustoconical) wall sections, the slope of which decreases from top to bottom.

The discharge and subsequent removal of water are improved if the basket has a device which can cause it to vibrate or oscillate. In this connection, the vibrations or oscillations can be produced by an out-of-balance motor or A.C. magnets.

BRIEF DESCRIPTION OF THE DRAWING

An exemplary embodiment of the invention is described in greater detail below and is shown in the drawing, in which:

FIG. 1 is a vertical axial section through the screening device; and

FIG. 2 is a section along II—II in FIG. 1, with the screen lining only being shown at the beginning of the feed and at the end.

SPECIFIC DESCRIPTION

The screen basket 1 has three frustoconical screen sections 2,3 and 4 which are arranged one above the other and adjoin one another, the lowermost screen section 2 of which has the smallest slope and the uppermost screen section 4 of which has the largest slope, so that the cone angle $\beta$ of these truncated cone jackets is at a maximum in the case of the lowermost screen section 2 and at a minimum in the case of the uppermost screen section 4. With its lower edge, the lowermost screen element 2 forms an outlet opening 5 for the solid matter after it has been processed. The screen sections 2,3 and 4, which are made up of screen elements, are supported on the outside by a metal wall 6 which has openings for discharging the liquid. This liquid flows into the housing 7 which encloses the device and has an outlet 8 at the lower end.

A spiral-shaped area 9 is fixed above the uppermost, conical screen jacket 4, which area 9 has a screen surface 10 bent in a spiral shape and consisting of screen elements. This screen surface 10 is vertical. The gap openings of this screen surface are expediently vertical, that is they extend across the direction of flow. The screen surface 10 is supported at the back by a row of bars 11 fixed to define a spiral. The material to be screened or the solid-liquid mixture is fed onto the screen surface by a tangentially directed nozzle 12 which horizontally projects the mixture tangentially at high speed above the region of the screening surface 10 which has the maximum radius. The mixture then flows along the horizontal, spiral-shaped region 9 with its vertical screen wall up to the screen lining location of the area 9 with the minimum radius, so as to then reach there the next lower screen section 4.

The screen basket jacket does not necessarily have to be made up of individual truncated cone sections, but can also be a single rotational body having a diameter and slope which decrease constantly from top to bottom. The basket can be fitted with common screen types, with slotted hole screens being preferred whose slots in the upper region are vertical or parallel to the generatrix of the wall and in the lower area can run in the peripheral direction in order to help, at the comparatively low speed there, the remaining liquid to drain from the collecting solid matter, so that it is then scarcely possible for liquid to reach the discharge opening 5.

The upper cylindrical part can be compared with a curved screen. If the screen basket connected on the outlet side and narrowing in diameter is to produce an optimum performance, uniform feeding must take place over the entire periphery. This is achieved according to the invention in that the cylindrical area 9 is formed in a spiral for about 180° to 340°, starting from the tangentially arranged feed nozzle 12. The flow of the feed material is pressed continuously inwards by the spiral screen wall and flows uniformly to the upper area of the first screen cone. Liquid is drawn at the same time from the feed flow by the spiral screen wall in accordance with the absorption capacity of this "curved screen".

The "absorption capacity" of a curved screen is inter alia directly proportional to the feed speed of the feed material. In cylindrical curved screens, this can be utilized up to speeds as high as desired. The speed is limited only by the wear of the screen elements, the housing, lines and pumps, which wear increases as speed increases, and by the pump performances.

Because of the friction on the screen, the speed v is continually reduced. The derived relationship between v', d and $\beta$ applies to all zones of the screen basket. The formula $$v = \sqrt{\frac{d \cdot g}{2 \cdot tg\beta}}$$

determines the path of the liquid flow on the screen basket. It corresponds to a conical spiral. Liquid is constantly drawn off through the screen gaps. What remains on the screen basket contains more and more solid matter; the viscosity and the friction on the screen increase. If the cone angle $\beta$ were constant, the liquid would rapidly flow steeply downwards to the solid matter discharge. This is counteracted by the downwardly increasing cone angles $\beta$, so that the majority of the liquid is extracted through the screen slots and only the condensed solid matter pulp reaches the lower discharge opening. Removing the remaining water is further helped by the screen gaps extending transversely at the bottom.

For example, the following values can be given:

$$d = \frac{1.2 \text{ m, } g = 9.81 \text{ m/s}^2}{v = \sqrt{\frac{1.2 \times 9.81}{2 \times tg\ 10°}} = 5.8 \text{ m/s}} \text{ and } \beta = 10°.$$

A feed nozzle 9 is provided as a rule. But it is also possible to arrange several nozzles on the periphery of the upper cylindrical part. Since the feed speed results from the feed quantity and nozzle cross-section, it is possible to largely adapt the device, the size of which is first established, to each feed quantity by selecting the nozzle cross-section. For this purpose, the feed nozzles are to be easily exchangeable and/or adjustable in cross-section.

As in the case of the known curved screen, it is possible, by selecting the gap width of the screen, to determine the "limiting grain" of the solid matter, that is the size of the coarsest grain which is discharged with the liquid, and the finest grain which still remains in the portion of solid matter.

The discharge and subsequent removal of water from the solid matter can be further improved by high frequency, axial vibrations of the entire conical basket or only its lower area. These vibrations can be produced by out-of-balance motors or A.C. magnets.

We claim:

1. An apparatus for separating a liquid from a solid of a solid-liquid mixture, comprising:
   a separating screen in the shape of at least one surface of revolution centered upon a vertical axis and having a diameter at an upper end of said screen which is greater than a diameter of said screen at a lower end thereof, the diameter of said screen progressively decreasing from said upper end to said lower end;
   means forming a solids-discharge opening at said lower end of said screen;
   means surrounding said screen for collecting said liquid upon traversal of said screen by said liquid;
   a mixture-inlet region formed by a spiral screen section at an upper end of said separating screen having an inlet location at which said spiral screen section has its largest radius, said spiral screen section decreasing progressively in radius away from said location; and
   means for optimizing the separation effect in the inlet region of said screens including means for tangentially feeding said mixture onto said mixture-inlet region at said location so that said mixture flows around said region at high velocity and then onto said separating screen to cause liquid of said mixture to pass through sieve openings in said screen and said screen region thereby separating said liquid from solids of said mixture, said sieve openings of said spiral screen section being slots extending perpendicular to the direction of flow of said mixture therealong.

2. The apparatus defined in claim 1 wherein said openings of said spiral screen section are slots perpendicular to the direction of flow of said mixture therealong.

3. The apparatus defined in claim 1 wherein said spiral screen section is vertical.

4. The apparatus defined in claim 1 wherein said means for tangentially feeding said mixture onto said mixture-inlet region at said location includes at least one nozzle trained tangentially onto said spiral screen section.

5. The apparatus defined in claim 4 wherein said nozzle is constructed and arranged so as to be exchangeable for other 5 nozzles with different cross sections.

6. The apparatus defined in claim 1 wherein said velocity v is $$\sqrt{\frac{d \cdot g}{2 \cdot tg\beta}}$$

where d is the upper diameter of said screen, g is the acceleration of gravity, and $\beta$ is the angle included between a generatrix of the screen and the vertical.

7. The apparatus defined in claim 1 wherein said separating screen has a slope which decreases from top to bottom.

8. The apparatus defined in claim 7 wherein said separating screen is made up of frustoconical sections disposed one above another and of progressively decreasing slope from top to bottom.

9. The apparatus defined in claim 1 wherein said separating screen is provided with a vibrator.

10. The apparatus defined in claim 1 wherein said separating screen is provided with means for oscillating said separating screen.

* * * * *